Jan. 22, 1963  G. J. TEPLANSKY ETAL  3,074,840
SINGLE-STAGE PROCESS FOR MOLDING DECORATED PLASTIC TABLEWARE
Filed Dec. 7, 1959  2 Sheets-Sheet 1

INVENTOR.
GEORGE J. TEPLANSKY
EDWARD P. GRASS
BURKE A. WEISEND
LAWRENCE LEWIS
BY
ATTORNEYS.

Jan. 22, 1963  G. J. TEPLANSKY ETAL  3,074,840
SINGLE-STAGE PROCESS FOR MOLDING DECORATED PLASTIC TABLEWARE
Filed Dec. 7, 1959  2 Sheets-Sheet 2
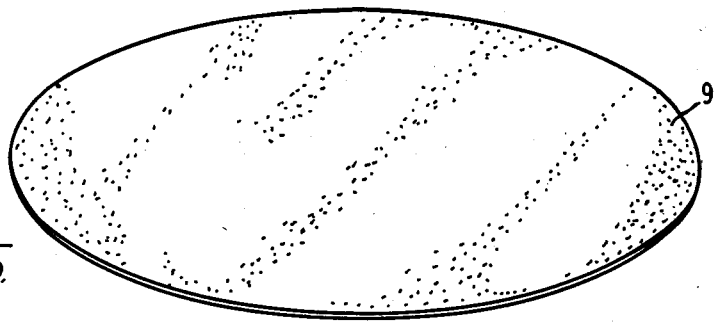
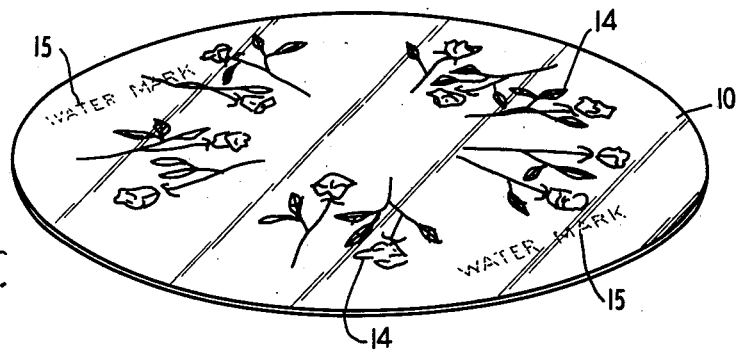
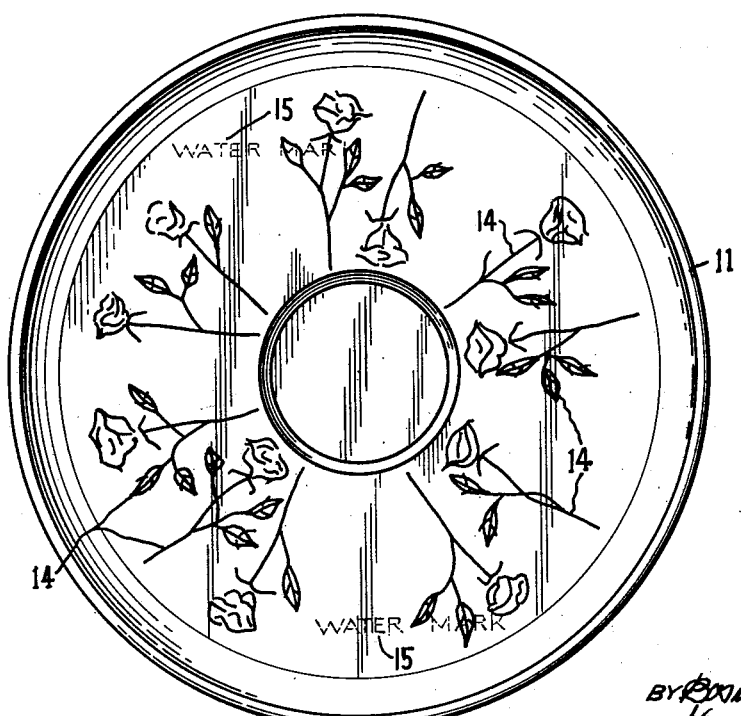
INVENTORS.
GEORGE J. TEPLANSKY
EDWARD P. GRASS
BURKE A. WEISEND
LAWRENCE LEWIS
BY
ATTORNEYS.

3,074,840
SINGLE-STAGE PROCESS FOR MOLDING DECORATED PLASTIC TABLEWARE
George J. Teplansky, University Heights, Edward P. Grass, Cleveland Heights, and Burke A. Weisend and Lawrence Lewis, Seven Hills, Ohio, assignors to Brookpark, Inc., a corporation of Ohio
Filed Dec. 7, 1959, Ser. No. 857,784
4 Claims. (Cl. 156—245)

This invention relates to a process and the product of a process for molding decorated plastic tableware in a single-stage operation.

The commercial molding of decorated plastic tableware in matched metal compression molds presents unusual difficulties because of the number, variety and need for close control of the many variables involved. The composition of the synthetic resin, the nature of the decoration, the pressure and temperature at which the molding step is carried out, the time required for curing, and the extent of the "draw" in the mold may be mentioned as illustrative of them. In the case of the decoration, the following criteria, among others, are applicable: it must not shift, fold or tear in the mold, it must not be rendered porous, blurred or otherwise imperfect in the molding process, and it must not produce delamination, blistering or similar defects in the final product.

As opposed to flat press curing of essentially plane products such as table tops, counters, tray bottoms and the like, the commercial molding of decorated plastic tableware in matched metal compression molds first became practicable only when it was found possible to use a technique based on the steps of incompletely curing the synthetic resin in the mold; opening the mold; applying to the incompletely cured product an overlay taking the form of a resin-impregnated sheet of a potentially transparent cellulosic material, such sheet incorporating the desired decoration; and, after introduction of the decorated sheet, closing the mold and completing the curing operation. Superatmospheric pressures and temperatures are required both before and after application of the decorated sheet to the incompletely cured product. This technique, now in widespread use in the molding of decorated plastic tableware in matched metal compression molds, is referred to hereinafter as two-stage molding.

Two-stage molding has serious disadvantages related to the need for opening and closing the mold between stages, among them an increase in the length of the cycle; cooling of the exposed surface of the incompletely cured product while the mold is open; the tendency of flash to adhere to and fall from the upper mold half onto the incompletely cured product; the occasional tendency on the part of the incompletely cured product to cling to the upper mold half rather than to remain in place on the lower mold half, thus making it impossible without loss of additional time to superimpose the sheet carrying the decoration; and the occurrence, for these and a variety of other reasons, of an unduly large proportion of imperfect products. Notwithstanding these and other disadvantages, two-stage molding has been generally employed for the commercial molding of decorated plastic tableware.

Attempts to introduce into a matched metal compression mold, along with the mold charge, a resin-impregnated sheet carrying the desired decoration have not heretofore been commercially successful, partly because a resin-impregnated sheet has a tendency to break when the mold is closed on it. Herein resides an important difference between the flat press curing of essentially plane objects such as table tops, counters, tray bottoms, etc. and the molding in matched metal compression molds of decorated plastic tableware such as plates, saucers, bowls and similar items that are required to have deep or shallow recesses on one or both sides. Draw in the mold resulting from the need for having such recesses in the product, together with flow of the resin in the mold, has made it impossible to carry over seemingly desirable features of flat curing techniques into the commercial molding of plastic tableware in matched metal compression molds.

The present invention has for one of its objects to make practicable the commercial molding in matched metal compression molds of decorated plastic tableware such as plates, saucers, bowls and the like by a single-stage operation permitting a substantial increase in the productive capacity of the plant. Another object is to eliminate deficiencies in prior processes for molding decorated plastic tableware resulting in the occurrence of imperfections in areas wherein the decoration is characterized by heavy concentrations of ink. Still another object is to provide a much improved product having a smoother, harder, more wear-resistant surface over the decoration and, if desired, inconspicuous markings elsewhere in the product that can be used to establish its origin.

Other objects, advantages and features of the invention will be apparent from the description which follows and from the accompanying drawings, in which:

FIGURES 5 and 6 are perspectives of the laminae appearing in section in FIGURE 3.

FIGURE 7 is a top plan of a saucer produced by the sequence of steps illustrated in FIGURES 1 to 4, inclusive.

Figure 1:
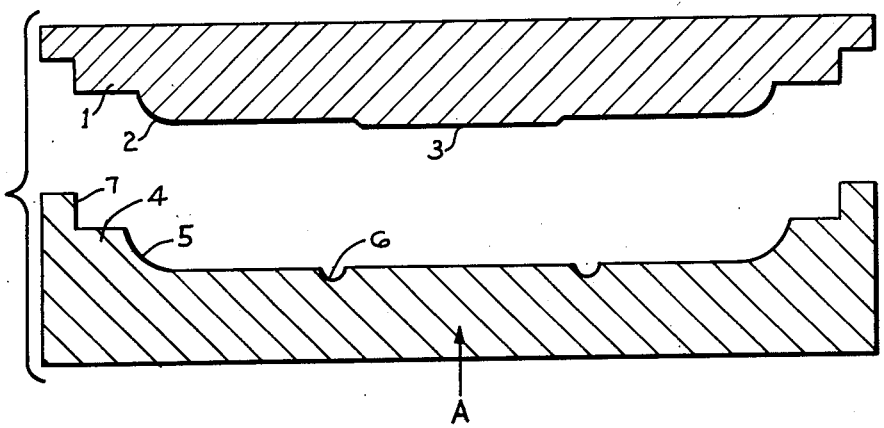
FIGURE 1 is a central vertical section through a representative matched metal compression mold of a kind that may be employed to advantage in the practise of the present invention, the two mold halves being shown for convenience in illustration as somewhat more closely spaced than normally would be the case when the mold is idle.

The matched metal compression mold illustrated in FIGURE 1, which is designed for the molding of a saucer, comprises a stationary upper mold half 1 provided on its lower face with a curviform surface 2 of circular shape corresponding generally to the upper surface of the saucer to be molded. Located centrally of and depending from curviform surface 2 of mold half 1 is a shallow projection 3 which is provided in order to form a suitable cup-seating recess in the saucer. Lower mold half 4, which is movable toward upper mold half 1 by the application of force in the direction indicated by arrow A, is characterized by a curviform cavity 5 of circular outline corresponding generally to the lower surface of the saucer to be molded. Centrally located on the upper face of lower mold half 4 is a ring-shaped recess 6 for forming a circular seating bead on the saucer bottom. Forming part of lower mold half 4 is a collar 7 used for centering purposes.

Figure 2:
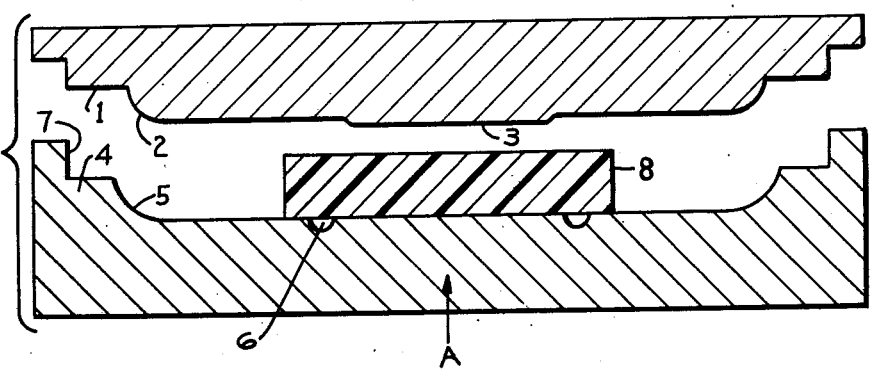
FIGURE 2 is a similar section through the same mold with a pre-formed synthetic resin mold charge in place on the lower mold half.

The flat surfaces at the bottom of cavity 5 provide a convenient place on which to rest one or more pre-formed synthetic resin mold charges, sometimes referred to as "pills." These may be of any convenient shape but in practice usually take the form of rectangular cakes of compressed powder or agglomerated granules of synthetic resin weighing from 70 or less to 240 or more grams. Pre-formed mold charges such as the pill 8 shown in FIGURES 2 and 3 permit accurate control over the weight of the mold charge. They can readily be preheated to temperatures approaching actual molding temperatures. When the mold closes on them they flow quickly under the joint influence of pressure and heat.

Although the possibility of employing pre-formed mold charges of this kind is inherently commercially attractive, yet so far as concerns its feasibility for the manufacture of decorated plastic tableware by single-stage molding techniques making use of matched metal compression molds, it has heretofore been looked upon as wholly unworkable. The reason for this belief has resided in the fact that the distortions in a resin-impregnated sheet occasioned by the mold itself can be expected to be augmented by distortions attributable to the presence in the mold of one or more pre-formed mold charges. These considerations notwithstanding, the present invention can and does make use of pre-formed mold charges of this kind in a single-stage molding operation, although it may, if desired, dispense with them and use commercial synthetic resin powders or granules in place of them.

According to the present invention, reliance is not placed, as heretofore, on the use of a single resin-impregnated sheet in which the desired decoration is incorporated. Instead, the invention in its preferred form contemplates the use of two or more laminae of suitable size and shape capable of becoming transparent in the final product one of which, designated 9, comprises an unprinted resin-rich sheet and the other of which, designated 10, comprises an imprinted sheet that is resin-poor in the sense that it is largely or entirely free of synthetic resin. These laminae appear in FIGURE 3, wherein they are shown as centered within collar 7 on lower mold half 4.

Before impregnating, lamina 9 may conveniently take the form of a thin, light web ("tissue") of alpha cellulose. If, as usually will be the case, such tissue is not imprinted or otherwise decorated, the resin content of the impregnated and dried sheet may run as high as 70% or more of the total weight; i.e., it may be completely saturated with and may even contain an excess of synthetic resin. Lamina 10, which underlies, supports and reinforces lamina 9, preferably is fairly sturdy, yet in relation to lamina 9 it may be comparatively thin. Although lamina 10 can be of bond, parchment or other paper, card stock, woven or non-woven fabric or the like, in the preferred embodiment of the invention it is of high quality 100% linen rag paper with only normal inclusions of sizing materials, clay, titanium dioxide and the like.

Lamina 10, rather than lamina 9, is relied on to supply the decoration, which can be imprinted on it at any convenient time and in any convenient way by flat-bed, roll or screen printing, embossing or otherwise. It can be provided on its upper surface with an upwardly facing design, provided on its lower surface with a downwardly facing design, in the latter case in the form of a mirror image, or, if desired, provided on both surfaces with designs applied at different times to the same stock. If desired, it may be provided in the usual way with a water mark, which, as will appear below, may be the trademark or name of the manufacturer of the molded product. As a rule, it is preferred to perform the operations of printing, drying and cutting to shape on a discontinuous or batch basis not too long before the material is to be used, thus obviating the need for keeping a perishable inventory of material printed in a variety of different designs. Inasmuch as the stock of which lamina 10 is formed can advantageously be and preferably is of material that is receptive of ink rather than resistant to it, high quality printing with sharp definition of the decoration is possible.

Figure 3:
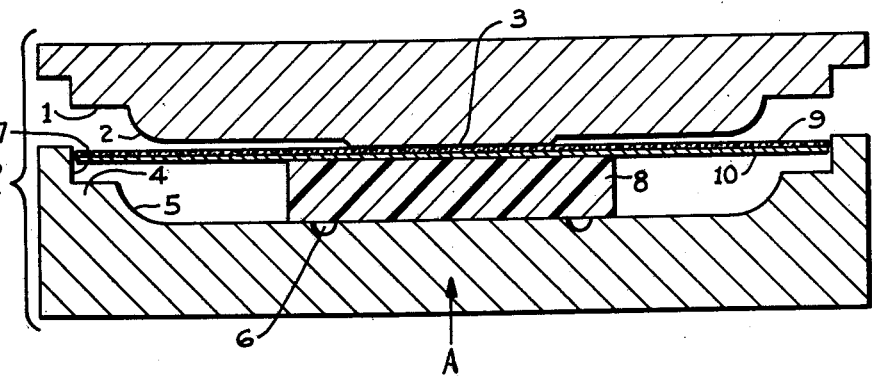
FIGURE 3 is a similar section through the same mold showing the two mold halves as they appear when about to close on the contents of the mold, such contents including a plurality of laminae superimposed on such pre-formed mold charge.

Laminae 9 and 10, seen only in section in FIGURE 3, are shown in perspective in FIGURES 5 and 6, respectively.

Figure 4:
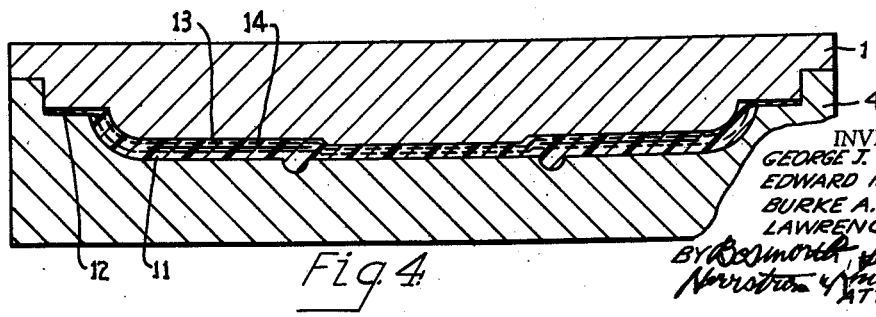
FIGURE 4 is a similar section through the same mold as it appears during the molding step.

FIGURE 4 illustrates the actual molding operation. In this figure, in which molded product 11 is seen in section, a thin flash 12 appears between the two mold halves. Laminae 9 and 10, shown in dotted lines 13 to indicate that they have become transparent, extend into flash 12. Flash is a normal incident of molding, whether it be done in two stages as in the past or in a single stage in accordance with the teachings of the present invention. It can be removed from a molded product by tumbling the product or trimming it mechanically by means of a tool. In any event, since the mold is not opened in single-stage molding until curing is complete, there is no opportunity, as in two-stage molding, for partially cured flash to adhere to and accompany the upper mold half to an elevated position from which it can fall onto an incompletely cured product.

In the form of the invention illustrated in FIGURES 3, 4 and 5, lamina 9, being unprinted, can be and preferably is impregnated in high degree with synthetic resin, even beyond the point of saturation. Thus an appreciable amount of the resin incorporated in it can become available during molding. Part of it goes to form a smooth, hard, durable wear surface on the upper face of the molded product. By omitting printing on lamina 9, the present invention therefore takes advantage of the fact that the greater resin content of a highly impregnated tissue helps provide the molded product with an improved wear surface.

At the same time, lamina 10, being more or less bibulous and, when first introduced into the mold, largely or entirely free of synthetic resin, is enabled to absorb synthetic resin from both sides. In the course of the molding operation, lamina 10 absorbs resin from lamina 9 on one side and, on the other, from pre-formed mold charge 8. This fact, taken with the fact that the curing step is accomplished in a single stage without opening the mold in the meanwhile, results in a high degree of resistance to delamination at the interface between lamina 9 and lamina 10. There is excellent bonding of the various parts of the product to each other, as, for example, of the wear surface to the portion of the product below laminae 9 and 10.

As indicated in FIGURE 7, water marks 15, if present in lamina 10, are not obliterated but under favorable conditions remain visible to the eye.

In the preceding discussion, no attempt has been made to limit to a synthetic resin of a particular type the resin from which the finished product is made, this for the reason that the invention may be carried out successfully with synthetic resins of widely different types. The invention may be employed with either thermoplastic or thermosetting resins, although resins of the thermosetting type are much preferred for tableware, largely because they are hard, scratch-resistant and resistant to hot water, organic solvents, household stains, etc. Of the thermosetting resins, the aminoplasts are best for the purposes of the present invention, particularly cellulose-filled melamine-formaldehyde of various kinds that are commercially available at the present time in the form of powder or granules.

In a typical case, the synthetic resin used in the mold charge will be a commercial melamine-formaldehyde molding powder containing 35% of alpha cellulose as a filler; e.g., American Cyanamid Company's Cymel 1077 or Allied Chemical Company's Plaskon TWX–22. In making up lamina 9 in such circumstances, any suitable unfilled melamine-formaldehyde molding powder may be employed in aqueous solution; for example, American Cyanamid Company's Cymel 405. If desired, it is possible to use in the mold charge a filled urea-formaldehyde molding powder such as American Cyanamid Company's Urac 125, which has an alpha cellulose content of 40%. If the latter or a similar molding powder is used in the mold charge, the molding powder employed in making lamina 9 should, in the interests of compatibility, be an unfilled urea-formaldehyde resin. In place of urea-formaldehyde resins, thiourea-formaldehyde resins may be used for both purposes, if desired.

Taking as an example a typical melamine-formaldehyde molding powder such as one of those previously mentioned, the temperatures and pressures at which the single stage molding step of the present invention is carried out are not greatly different from those employed in two-stage molding. In both cases, pressures of the order of a few hundred to a few thousand pounds per square inch may be employed, usually about 3000 p.s.i. In single-stage molding, in which it is not necessary to pre-compensate for the cooling occasioned by opening the mold on an incompletely cured product, temperatures may be lower or higher than those used in two-stage molding; e.g., they may be of the order of 320° to 340° F. At the same time, the length of the molding cycle may be reduced from as much as two minutes in the case of two-stage molding to as little as one half minute. Using the same equipment, it thus becomes possible to increase plant productive capacity very substantially; e.g., up to and even beyond 75% in certain cases.

Mention has already been made of the fact that at the present time a tissue of alpha cellulose is preferred as the base of lamina 9 and high quality rag paper is preferred as the base of lamina 10. In place of a tissue of alpha cellulose, other materials of varying thicknesses between 2 mils or less and 20 mils or more may be employed in lamina 9. Examples are rice paper; papers and fabrics made from rayon, cotton, linen and similar fibers of vegetable origin; papers and fabrics made from glass fibres, nylon, polyacrylonitrile, polyesters, etc. It is not necessary that the base of alumina 9 be of fibrous material: it may, if desired, take the form of continuous film or a discontinuous (porous) film of suitable composition. Preferably it will be transparent or will become transparent in the course of the molding operation; however, it may be translucent or even opaque if desired.

In place of rag paper, which is preferred as the base of lamina 10, it is possible to use ordinary bond paper, paper of the type referred to as woven parchment (a parchment paper with a pattern embossed in it during calendering), various other types of paper, thin card stock and many other similar materials, whether or not of the nature of paper, onto which a suitable decoration has been or can be applied. In general, the materials already mentioned as suitable for the base of lamina 9 are suitable for lamina 10 provided they are sufficiently sturdy to permit them to remain substantially intact in the mold. Preferably, the material of which lamina 10 is made, like that characterizing the lamina 9, should be or should become transparent when incorporated in the molded product, but if desired it may be translucent or opaque.

The physical characteristics desired in lamina 10 may be summarized by stating that, in general, the material of which it is made preferably should have a thickness between 2 mils and 20 mils, a stretch of 1% or less as measured by a Mullen tester, a dry bursting strength of at least 20 pounds per square inch, a wet bursting strength of at least 6 pounds, an internal tear resistance of at least 40 pounds, and, before printing, a weight of the order of 30 to 100 pounds per ream. Whether smooth or rough finished, material of these specifications, if otherwise suitable, is likely to be sufficiently resistant to stress to serve as a reinforcement for lamina 9. If of the stated characteristics, the material is less likely to tear in the mold than to yield to conform to the mold, to the presence in it of one or more preformed mold charges, and to the flow of molten resin in the mold.

The ink used in printing may be of any appropriate kind, having in mind the chemical compositions of laminae 9 and 10, and may be applied on a batch or continuous basis, as may be preferred.

According to present two-stage molding practices, the tissue that is to carry the decoration is continuously impregnated with resin, dried in long tunnels, printed, dried a second time, cut to length and collected in suitable form, usually while traveling at high speed. This tends to result in large inventories of decorated tissue, part of which may remain in stock for many months before being put to use. In the meanwhile, the design with which the tissue is imprinted may deteriorate or lose its appeal to the public, resulting in the loss of substantial quantities of otherwise usable material. Also, since the printing is done on previously impregnated tissue, high quality printing is difficult to achieve, thus making for relatively large amounts of scrap. By the present process, in which the material used in lamina 10 not only is largely or entirely free of resin but may be imprinted on a batch basis when needed, scrap resulting from imperfect printing is of small proportions and the amount of the printed material carried in inventory may be very greatly reduced.

Other important advantages also result from the above-described process of making decorated plastic tableware by a single-stage molding operation. Among these is the fact that in practically every case the desired decorative effect can be produced in the product without imperfections, there being a notable absence of disrupted design elements such as may be caused by the folding or tearing in the mold of a decorated resin-impregnated tissue. The fact that pre-formed mold charges may be used, notwithstanding the distortion that such mold charges tend to bring about, makes for operating economies. The step of removing back-scattered flash from an incompletely cured product in order to prevent the formation of blemishes in the finished product is no longer necessary. Furthermore, there is no loss of production due to the tendency of an incompletely molded product to adhere to the upper rather than to the lower mold half, thus delaying or preventing introduction of the desired decoration. Another advantage of the process resides in the fact that during molding pressure is maintained on the laminae, thus keeping them from shifting in the mold; still another resides in the fact that, if desired, the well diameter of the mold cavity may be reduced in circumstances in which such reduction may be advantageous.

Changes in what has been shown in the drawings and described in the foregoing paragraphs may be made by those skilled in the art without departing from the spirit of the invention. Thus it is possible, if desired, to print, emboss or otherwise decorate both laminae. Either or both may be colored, if desired. Laminae 9 and 10 need not be circular in shape, as shown in FIGURES 5 and 6; instead, they may take the form of segments, sectors or other fractions of a circle, thus permitting spot decoration of the product. In order to obtain the benefits of the invention, it is not necessary to forego impregnation of lamina 10 where such impregnation may be desired: it is sufficient if lamina 10 is left largely unimpregnated, so that it can absorb synthetic resin from lamina 9 on one side and from the mold charge on the other. In some circumstances, it will be found possible to omit the base used in lamina 9 in what is presently regarded as the preferred embodiment of the invention, in which case lamina 9 will take the form of a sheet of filled or unfilled synthetic resin.

It is intended that the patent shall cover, by summarization in appended claims, whatever features of novelty reside in the invention.

What is claimed is:

1. A single-stage process for molding decorated plastic tableware in a matched metal compression mold comprising the steps of introducing into the mold cavity a preformed pill of synthetic resin, a resin-poor decorated insert of high wet strength and a resin-rich undecorated insert of low wet strength that is impregnated in high degree with synthetic resin compatible with the synthetic resin of the mold charge, said decorated and undecorated inserts taking the form of separate laminae; closing the mold; and, without opening the mold in the meanwhile, subjecting the contents of the mold to superatmospheric pressures and temperatures for a period of time long enough to effect a cure.

2. A single-stage process for molding decorated plastic tableware in a matched metal compression mold which comprises the steps of applying at least one preformed pill of synthetic resin to the lower mold half; superimposing a resin-free decorated lamina on said pill without closing the mold in the meanwhile and superimposing on the decorated lamina a second lamina that is heavily impregnated with a synthetic resin; closing the mold; and subjecting the contents of the mold to superatmospheric pressures and temperatures for a period of time long enough to completely cure the synthetic resin.

3. A single stage process for molding decorated plastic tableware in a matched metal compression mold which comprises the steps of applying at least one preformed pill of synthetic resin to the lower mold half; superimposing a resin-free decorated lamina on said pill without closing the mold in the meanwhile, said lamina comprising a sheet of paper stock characterized by a high wet strength; superimposing on the decorated lamina a second lamina that is heavily impregnated with a synthetic resin; closing the mold; and subjecting the contents of the mold to superatmospheric pressures and temperaures for a period of time long enough to completely cure the synthetic resin.

4. A single-stage process for molding decorated plastic tableware in a matched metal compression mold which comprises the steps of introducing a charge of synthetic resin into the mold cavity; superimposing a decorated lamina of relatively high wet strength on said mold charge without closing the mold in the meanwhile; said decorated lamina being largely free of synthetic resin; superimposing on the decorated lamina a second lamina that is heavily impregnated with synthetic resin, likewise without closing the mold in the meanwhile; closing the mold; and subjecting the contents of the mold to superatmospheric pressures and temperatures for a period of time long enough to completely cure the synthetic resin.

References Cited in the file of this patent

UNITED STATES PATENTS

| | | |
|---|---|---|
| 2,760,899 | Cameron et al. | Aug. 28, 1956 |
| 2,833,685 | Lawrence | May 6, 1958 |

FOREIGN PATENTS

| | | |
|---|---|---|
| 246,886 | Great Britain | Feb. 9, 1926 |
| 739,801 | Great Britain | Nov. 2, 1955 |